(12) United States Patent
Gentillet et al.

(10) Patent No.: US 7,663,266 B2
(45) Date of Patent: Feb. 16, 2010

(54) MODULAR DC-DC STANDBY VOLTAGE CONVERTER HAVING PROGRAMMABLE SEQUENCING

(75) Inventors: Jerome Gentillet, Round Rock, TX (US); Keith Kasprzak, Cedar Park, TX (US); Bassam Marawi, Austin, TX (US); Thierry Pellegrino, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 322 days.

(21) Appl. No.: 11/854,397

(22) Filed: Sep. 12, 2007

(65) Prior Publication Data
US 2009/0008996 A1    Jan. 8, 2009

Related U.S. Application Data

(63) Continuation of application No. 10/677,698, filed on Oct. 2, 2003, now abandoned.

(51) Int. Cl.
*H02J 7/00* (2006.01)
(52) U.S. Cl. ...................................................... 307/65
(58) Field of Classification Search .................... 307/65
See application file for complete search history.

(56) References Cited

U.S. PATENT DOCUMENTS

| | | | | |
|---|---|---|---|---|
| 5,272,614 A | * | 12/1993 | Brunk et al. | 363/21.05 |
| 5,341,278 A | * | 8/1994 | Brooks | 363/16 |
| 5,412,555 A | * | 5/1995 | Uramoto | 363/18 |
| 5,959,411 A | * | 9/1999 | Veldman | 315/224 |
| 6,031,702 A | * | 2/2000 | Williams | 361/87 |
| 6,052,790 A | * | 4/2000 | Brown | 713/300 |
| 6,166,602 A | * | 12/2000 | Steigerwald et al. | 330/251 |
| 6,181,123 B1 | * | 1/2001 | Jou et al. | 323/351 |
| 6,346,798 B1 | * | 2/2002 | Passoni et al. | 323/272 |
| 6,600,298 B2 | * | 7/2003 | McDonald et al. | 323/271 |

* cited by examiner

*Primary Examiner*—Robert L. Deberadinis
(74) *Attorney, Agent, or Firm*—Baker Botts L.L.P.

(57) ABSTRACT

An information handling system having a modular DC-DC standby power converter with programmable sequencing. The modular DC-DC standby power converter comprises a plurality of DC inputs and a plurality of DC outputs. The modular DC-DC standby power converter may also be bypassed and/or put into an off-state such that a voltage(s) of at least one output of the converter may then be the same voltage(s) of at least one input. When the modular DC-DC standby power converter is bypassed and/or in the off-state, its outputs may be at a high impedance. The output voltage(s) may be adjusted for specific system requirements. Turn-on and turn-off sequencing of the output voltage(s) may be programmed. The modular DC-DC standby power converter may have short circuit protection.

26 Claims, 4 Drawing Sheets

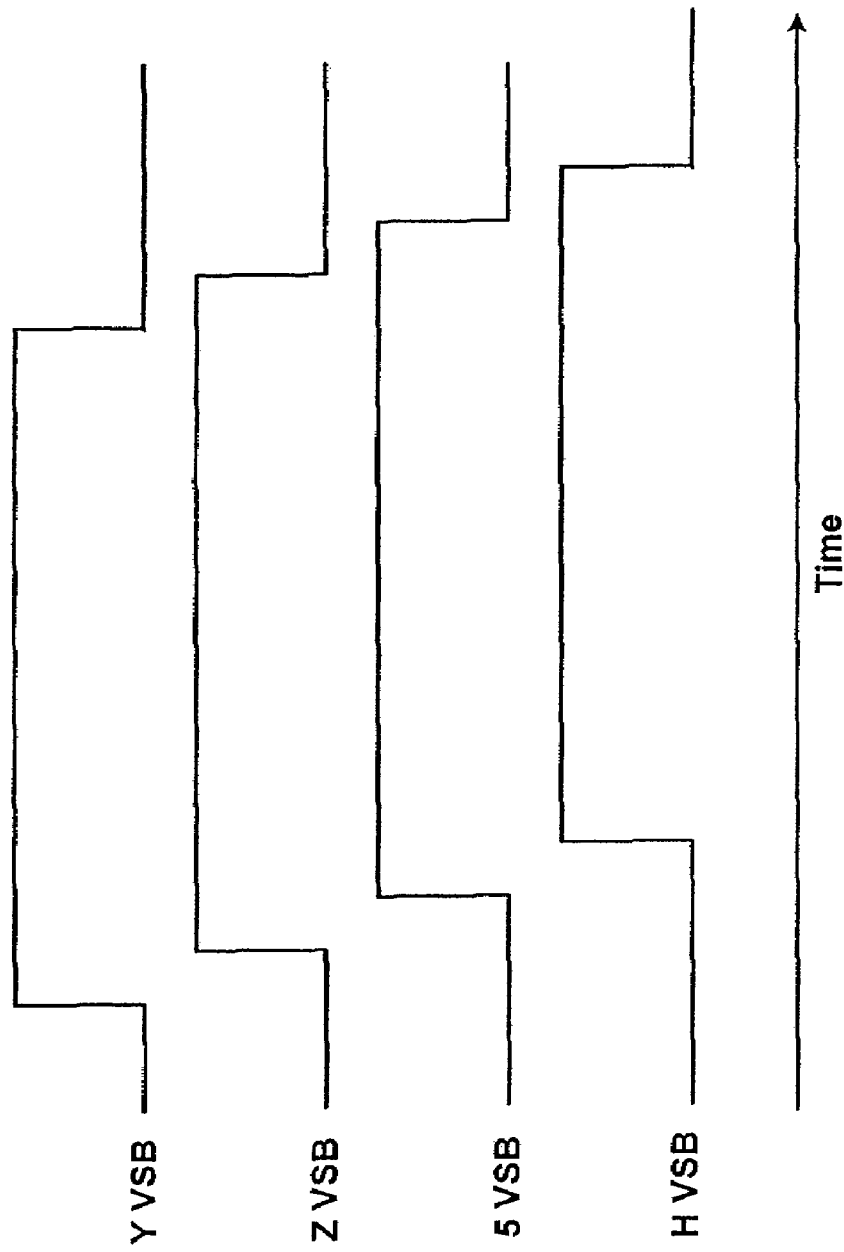

MODULAR DC-DC STANDBY VOLTAGE CONVERTER HAVING PROGRAMMABLE SEQUENCING

This application is a continuation of U.S. application Ser. No. 10/677,698, filed Oct. 2, 2003 now abandoned.

BACKGROUND OF THE INVENTION TECHNOLOGY

1. Field of the Invention

The present invention relates to information handling systems, and more specifically, to flexible standby voltage distribution and sequencing for the information handling systems.

2. Background of the Related Technology

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

As the complexity of information handling systems has increased, so has the need for various different standby voltages increased. These standby voltages are used to power circuits in the information handling system used for activation and wake-up of the system, e.g., power-on control, network interface card (NIC), etc. Five (5) volts has been the standard for standby voltage, however, it is quickly fading in favor of 3.3 volts standby becoming the dominate standby voltage. For certain devices, e.g., Embedded Server Management (ESM) and Wake On LAN (WOL), the standby voltages required are even lower, e.g., 2.5 volts and 1.2 volts, respectively. The WOL may activate the information handling system when signals from the LAN (Local Area Network) are received by the NIC of the information handling system.

A problem exists, however, in that the required standby voltages may be supplied by various types of power supplies. Typically, there has been no standardization for these power supplies, nor has any consideration been made for proper sequencing of the voltages from these standby power supplies. Therefore, complex circuitry must be used when the information handling system goes from a standby condition to a power-on condition. An excessive amount of motherboard real estate may be required for the necessary standby power components. In addition, sequencing of the standby power supply voltages is not easily implemented since additional logic, e.g., CPLD, is required. The power supplies also may suffer from low efficiency and high power dissipation through the use of linear regulators.

Therefore, what is needed is a standardized standby power supply system that can supply a plurality of necessary standby voltages for an information handling system, and, in addition, may easily sequence these standby voltages on and off in any desired programmable order.

SUMMARY OF THE INVENTION

The invention remedies the shortcomings of the prior standby power supply technologies by providing a modular DC-DC standby power converter with programmable sequencing. An exemplary embodiment of the invention comprises a plurality of DC inputs and a plurality of DC outputs. The modular DC-DC standby power converter may also be bypassed and/or put into an off-state such that a voltage(s) of at least one output of the converter may then be the same voltage(s) of at least one input. When the modular DC-DC standby power converter is bypassed and/or in the off-state, its outputs may be tri-stated, e.g., at a high impedance. In addition, the output voltage(s) may be adjusted for specific system requirements. Turn-on and turn-off sequencing of the output voltage(s) may be programmed, according to the exemplary embodiment of the invention. The modular DC-DC standby power converter may also be scalable and easily upgraded, e.g., additional voltage outputs, short circuit protection, greater current capacity, etc.

The invention is directed to an information handling system having a DC-DC standby voltage converter, said information handling system comprising: information handling equipment having a plurality of devices requiring a plurality of standby voltages; and a DC-DC standby voltage converter comprising: a plurality of sequencers, each of the plurality of sequencers having a first input, a first output and a control input, wherein a voltage on the first input is sequenced on and off at the first output depending upon a logic state at the control input; and at least one charge pump having a second input, a second output, and voltage adjustment input, wherein the second input has a voltage of a first value and the second output has a voltage of a second value, whereby the voltage adjustment input determines the second voltage value; wherein the first input of at least one of the plurality of sequencers is coupled to the second output of the at least one charge pump and receives the second voltage value therefrom; and the plurality of devices are coupled to the first outputs of the plurality of sequencers and receive the plurality of standby voltages therefrom.

The invention is also directed to a DC-DC standby voltage converter, comprising: a plurality of sequencers, each of the plurality of sequencers having a first input, a first output and a control input, wherein a voltage on the first input is sequenced on and off at the first output depending upon a logic state at the control input; and at least one charge pump having a second input, a second output, and voltage adjustment input, wherein the second input has a voltage of a first value and the second output has a voltage of a second value, whereby the voltage adjustment input determines the second voltage value; wherein the first input of at least one of the plurality of sequencers is coupled to the second output of the at least one charge pump and receives the second voltage value therefrom.

The invention is also directed to a method of providing sequenced standby voltages for an information handling system, said method comprising: providing a plurality of standby voltages for a plurality of devices in an information handling system; sequencing the plurality of standby voltages with a plurality of sequencers; and providing at least one standby voltage of the plurality of standby voltages with a charge pump, the at least one standby voltage having a different voltage value then the other ones of the plurality of standby voltages A technical advantage of the present invention is improved power efficiency. Another technical advantage is better packaging by using less space on a system circuit board. Still another technical advantage is the ability to adjust the output voltages for specific system requirements. Another technical advantage is decreased cost because of increased volume of production for a standard modular DC-DC standby power converter. Another technical advantage is adaptable use for a plurality of different types of information handling systems. Another technical advantage is the modularity of a DC-DC standby power converter in a single board or assembly. Yet another technical advantage is improved testing of the universal modular DC-DC standby power converter. Another technical advantage is scalable/upgradeable number of outputs, current capacity, and/or short circuit protection features. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein:

FIG. 4 is a schematic timing diagram of another exemplary embodiment of the invention;

Figure 1:
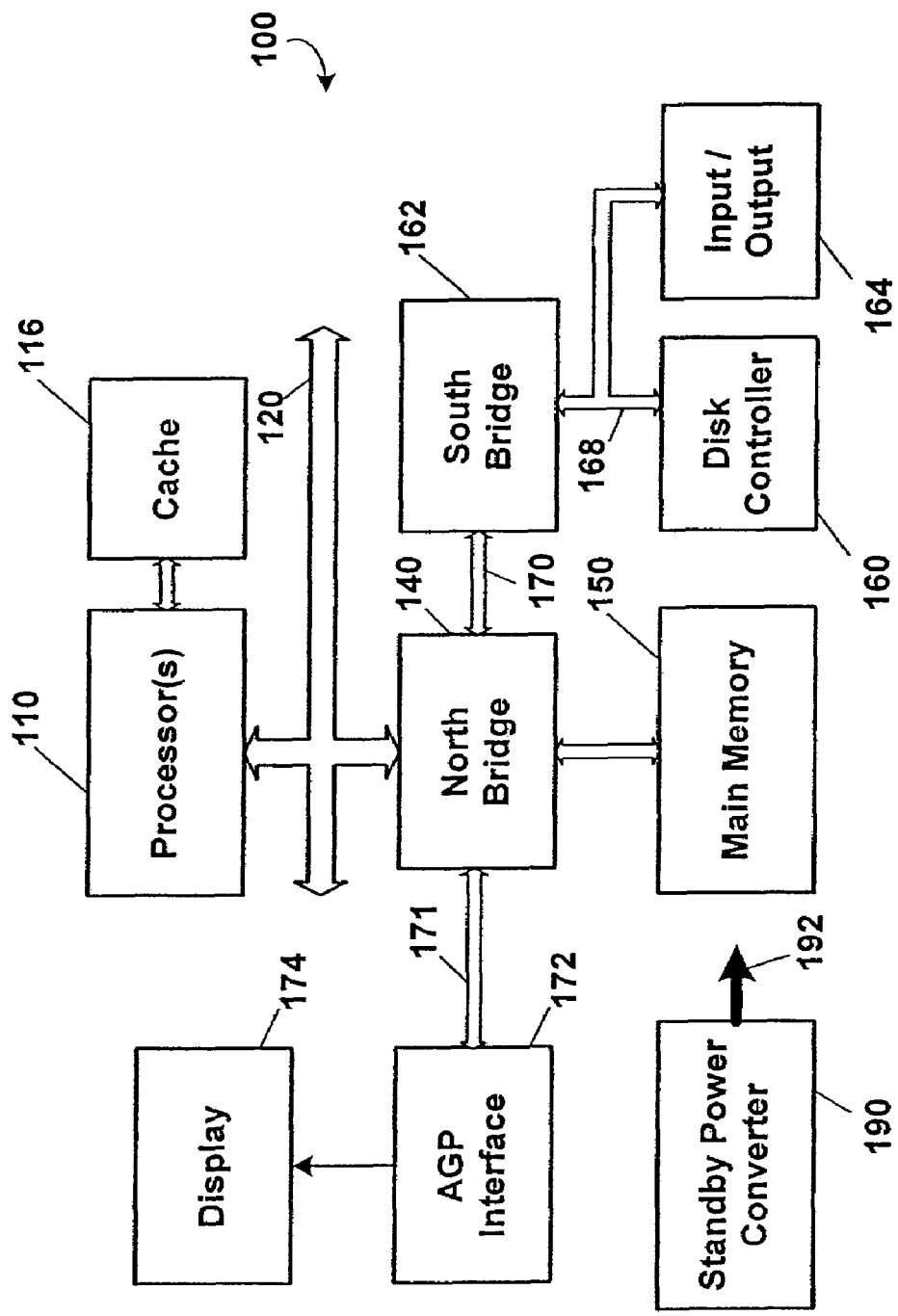
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises at least one processor 110 coupled to a host bus 120. A north bridge 140, which may also be referred to as a memory controller hub or a memory controller, is coupled to a main system memory 150. The north bridge 140 is coupled to the system processor 110 via the host bus 120. A basic input/output system (BIOS) 112 comprises firmware used during start-up of the information handling system 100, and for system hardware house keeping functions. The BIOS 112 may be any non-volatile memory, e.g., electronically erasable read only memory (EE-PROM) or FLASH memory.

The north bridge 140 may be generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, and an AGP bus 171 coupled to a AGP graphics interface 172 which drives a video display 174.

The PCI bus 170 couples at least one PCI device, e.g., compliant with the PCI Bus to the north bridge 140. A second bus(es) 168 may also comprise other industry standard buses or proprietary buses, e.g., ISA, SCSI, USB buses through a south bridge (bus interface) 162. The secondary buses 168 may have their own interfaces and controllers, e.g., ATA disk controller 160 and input/output interface(s) 164, e.g., network interface controller (NIC).

The information handling system 100 may have off, standby and operating conditions. Modern information handling systems 100 use electronic control to go between these three conditions. Electronic control of an information handling system requires some type of standby power source(s) for energizing the appropriate control circuits and devices. A standby power converter 190 may be used to supply these standby voltages 192 required for proper operation of the information handling system 100. For example, standby power must be supplied to a NIC 164 so that when a network wakeup signal is received the information handling system 100 goes from a standby to an operating condition.

Figure 2:
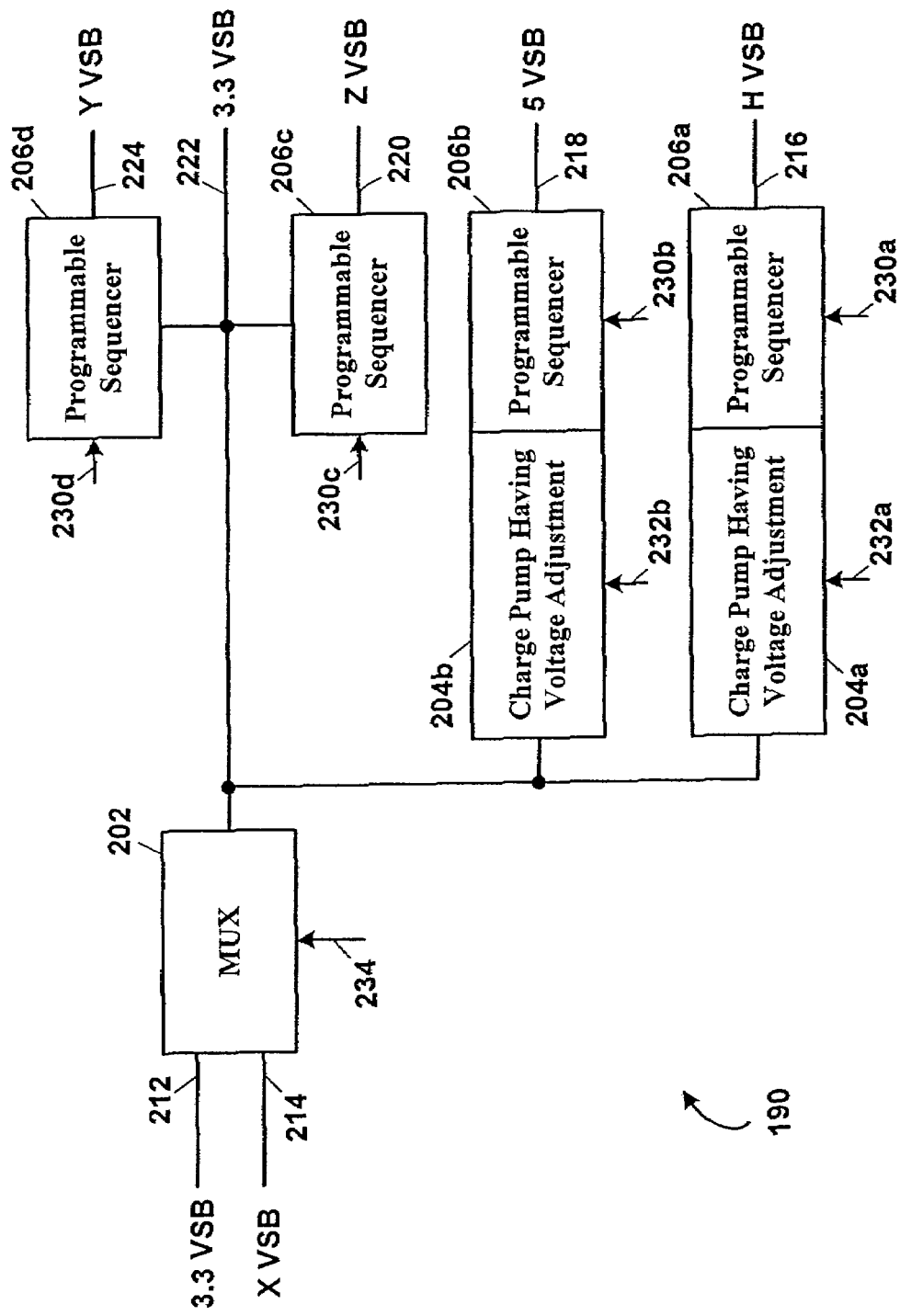
FIG. 2 is a schematic block diagram of a modular DC-DC standby voltage converter having programmable sequencing, according to an exemplary embodiment of the invention.

Referring to FIG. 2, depicted is a schematic block diagram of a modular DC-DC standby voltage converter having programmable sequencing, according to an exemplary embodiment of the invention. The standby power converter, generally represented by the numeral 190, has at least one voltage input 212 and a plurality of voltage outputs, e.g., voltage outputs 216, 218, 220, 222 and 224. The standby power converter 190 comprises a plurality of programmable sequencers 206 and at least one charge pump 204 having voltage adjustment capabilities. In addition, a multiplexer 202 may be used to switch between two or more input voltage sources (represented by 3.3 VSB and X VSB at inputs 212 and 214, respectively).

The charge pump 204 may be a switching regulator type power supply. The charge pump 204 may have an output voltage that is higher or lower than its input voltage. Generally, a switching regulator type power supply is more efficient than a linear regulator and is capable of having a higher output voltage than input voltage. According to the invention, the output voltage of the charge pump 204 may be adjusted with a voltage adjustment input 232. This voltage adjustment input 232 may be adapted for a variable reference voltage from, e.g., a trim potentiometer across a voltage reference, a digital input for specifying an output voltage, etc.

The programmable sequencers 206 may be used to turn on and off each of the voltage outputs 216, 218, 220 and 224 in a programmed sequence, e.g., some of these voltages turn on before the others and turn off after the others, or visa-versa. Each of the programmable sequencers 206 may have a sequence control input 230 which controls when the voltage output from the respective sequencer will turn on and off. A further function of the inputs 230 may be used as an enable for the outputs 216, 218, 220 and 224 such that when an output is not enabled it may be in a high impedance state, e.g., tri-state output.

The standby power converter 190 may further comprise a multiplexer 202 for selecting between a plurality of input voltages (e.g., at inputs 212 and 214). Control of which input voltage is selected may be performed through a voltage selection input 234. Various standby power sources may be utilized and selected with the multiplexer 202. In addition, the multiplexer 202 can supply any one of the input voltages available to an output 222 when the standby power converter 190 is not enabled and its outputs 216, 218, 220 and 224 may be in the high impedance tri-state condition.

Figure 3:
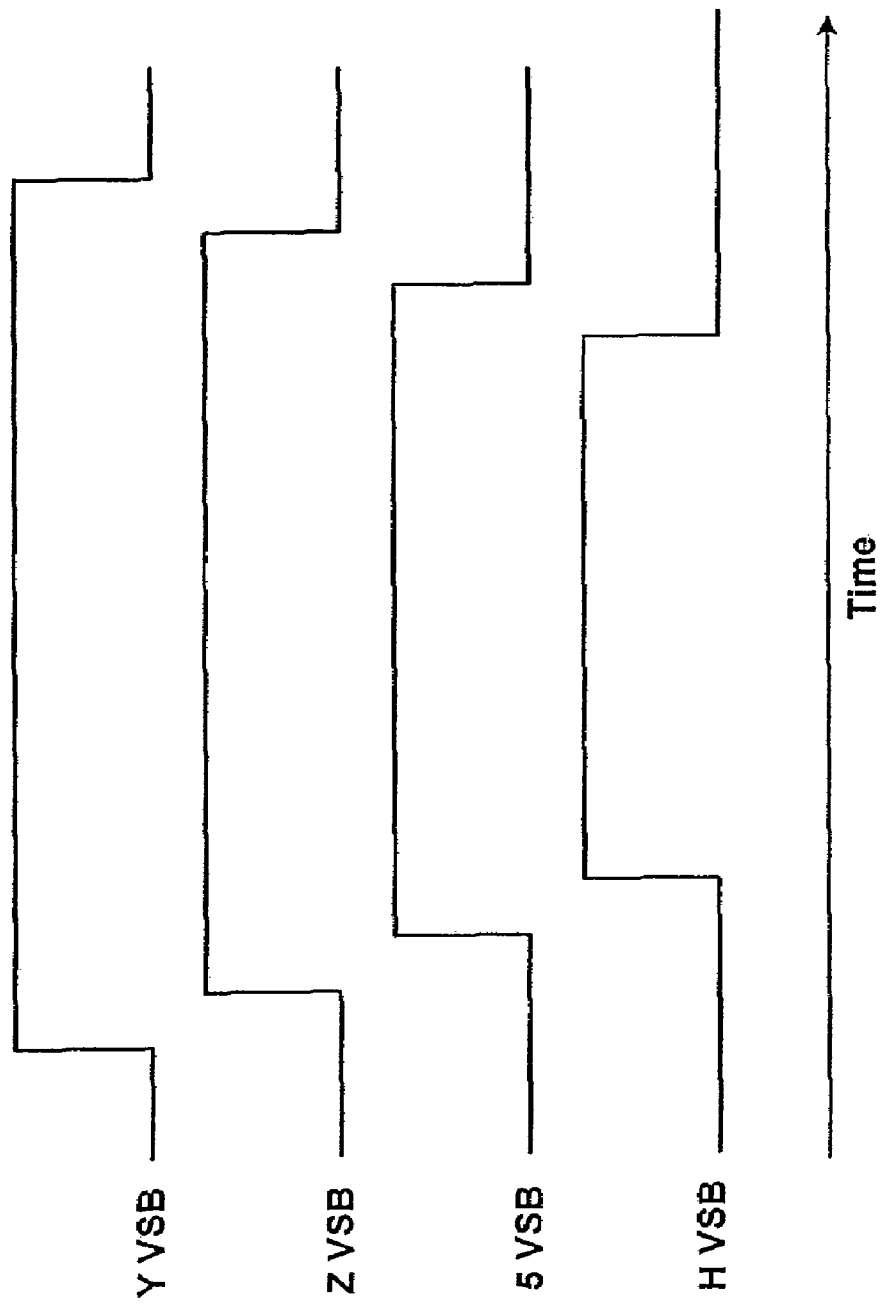
FIG. 3 is a schematic timing diagram of an exemplary embodiment of the invention.

Referring to FIG. 3, depicted is a schematic timing diagram of an exemplary embodiment of the invention. The voltages H VSB, 5 VSB, Z VSB and Y VSB on outputs 216, 218, 220 and 224, respectively, may be sequenced on and off in any predetermined manner. As shown in the schematic timing diagram of FIG. 3, Y VSB turns on first, then Z VSB next, then 5 VSB, and finally H VSB turns on last. When the voltages are turned off, H VSB turns off first, 5 VSB turns off next, then Z VSB turns off, and finally Y VSB turns off.

Referring to FIG. 4, depicted is a schematic timing diagram of another exemplary embodiment of the invention. The voltages H VSB, 5 VSB, Z VSB and Y VSB on outputs 216, 218, 220 and 224, respectively, may be sequenced on and off in any predetermined manner. As shown in the schematic timing diagram of FIG. 4, Y VSB turns on first, then Z VSB next, then 5 VSB, and finally H VSB turns on last. When the voltages are turned off, Y VSB turns off first, Z VSB turns off next, then 5 VSB turns off, and finally H VSB turns off.

It is contemplated and within the scope of the invention that any combination and order of voltages sequentially turning on and off may be programmed into the present invention. In addition, any number of input voltages and/or output voltages are contemplated and within the scope of the invention.

While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system having a DC-DC standby voltage converter, said information handling system comprising:
    information handling equipment having a plurality of devices requiring a plurality of standby voltages; and
    a DC-DC standby voltage converter comprising:
    a plurality of sequencers, each of the plurality of sequencers having a first input, a first output and a control input, wherein a voltage on the first input is sequenced on and off at the first output depending upon a logic state at the control input; and
    at least one charge pump having a second input, a second output, and voltage adjustment input, wherein the second input has a voltage of a first value and the second output has a voltage of a second value, whereby the voltage adjustment input determines the second voltage value;
        wherein the first input of at least one of the plurality of sequencers is coupled to the second output of the at least one charge pump and receives the second voltage value therefrom; and
        the plurality of devices are coupled to the first outputs of the plurality of sequencers and receive the plurality of standby voltages therefrom.

2. The information handling system according to claim 1, wherein the plurality of standby voltages are sequenced on and off with the plurality of sequencers in a predetermined order.

3. The information handling system according to claim 2, wherein the predetermined order is programmable.

4. The information handling system according to claim 1, wherein the standby voltages are of different voltage values.

5. The information handling system according to claim 1, wherein the first voltage value is greater than the second voltage value.

6. The information handling system according to claim 1, wherein the first voltage value is less than the second voltage value.

7. The information handling system according to claim 1, wherein the first voltage value is substantially equal to the second voltage value.

8. The information handling system according to claim 1, further comprising an enable input for enabling and disabling the first outputs of the plurality of sequencers.

9. The information handling system according to claim 8, wherein the first outputs are in a high impedance state when disabled.

10. The information handling system according to claim 1, further comprising:

a multiplexer having at least two inputs, an output and a control input, wherein the control input determines which one of the at least two inputs is coupled to the output; and the output of the multiplexer is coupled to the first inputs of those plurality of sequencers not coupled to the at least one charge pump and the second input of the at least one charge pump.

11. A DC-DC standby voltage converter, comprising:

a plurality of sequencers, each of the plurality of sequencers having a first input, a first output and a control input, wherein a voltage on the first input is sequenced on and off at the first output depending upon a logic state at the control input; and at least one charge pump having a second input, a second output, and voltage adjustment input, wherein the second input has a voltage of a first value and the second output has a voltage of a second value, whereby the voltage adjustment input determines the second voltage value;

wherein the first input of at least one of the plurality of sequencers is coupled to the second output of the at least one charge pump and receives the second voltage value therefrom.

12. The DC-DC standby voltage converter according to claim 11, wherein the voltages at the first outputs are sequenced on and off in a predetermined order.

13. The DC-DC standby voltage converter according to claim 12, wherein the predetermined order is programmable.

14. The DC-DC standby voltage converter according to claim 11, wherein the voltages at the first outputs are of different voltage values.

15. The DC-DC standby voltage converter according to claim 11, wherein the first voltage value is greater than the second voltage value.

16. The DC-DC standby voltage converter according to claim 11, wherein the first voltage value is less than the second voltage value.

17. The DC-DC standby voltage converter according to claim 11, wherein the first voltage value is substantially equal to the second voltage value.

18. The DC-DC standby voltage converter according to claim 11, further comprising an enable input for enabling and disabling the first outputs of the plurality of sequencers.

19. The DC-DC standby voltage converter according to claim 18, wherein the first outputs are in a high impedance state when disabled.

20. The DC-DC standby voltage converter according to claim 11, further comprising:

a multiplexer having at least two inputs, an output and a control input, wherein the control input determines which one of the at least two inputs is coupled to the output; and the output of the multiplexer is coupled to the first inputs of those plurality of sequencers not coupled to the at least one charge pump and the second input of the at least one charge pump.

21. A method of providing sequenced standby voltages for an information handling system, said method comprising:

providing a plurality of standby voltages for a plurality of devices in an information handling system;

sequencing the plurality of standby voltages with a plurality of sequencers; and providing at least one standby voltage of the plurality of standby voltages with a charge pump, the at least one standby voltage having a different voltage value then the other ones of the plurality of standby voltages.

22. The method according to claim 21, wherein the step of sequencing further comprises the step of programming the sequencing order.

23. The method according to claim 21, further comprising the steps of enabling and disabling the plurality of sequencers so that the plurality of standby voltages are on and off, respectively.

24. The method according to claim 23, wherein the step of disabling further comprises the step of placing outputs of the plurality of sequencers to a high impedance.

25. The method according to claim 21, further comprising the step of selecting between a plurality of standby voltage sources with a multiplexer.

26. The method according to claim 21, further comprising the step of adjusting the at least one standby voltage having the different voltage value.

* * * * *